(12) United States Patent
Schimnowski et al.

(10) Patent No.: US 6,668,665 B2
(45) Date of Patent: Dec. 30, 2003

(54) GAS LEVEL MONITORING SYSTEM AND GAS FLOW RATE SENSOR USED THEREIN

(75) Inventors: Kenneth Roger Schimnowski, Denison, TX (US); John W. Duffy, Bullshoals, AK (US); Joe Wilson McCarty, Marshalltown, IA (US); Richard Joseph Vanderah, Marshalltown, IA (US)

(73) Assignee: Fisher Controls International, Inc., Clayton, MO (US)

( * ) Notice: Subject to any disclaimer, the term of this patent is extended or adjusted under 35 U.S.C. 154(b) by 120 days.

(21) Appl. No.: 09/776,428

(22) Filed: Feb. 2, 2001

(65) Prior Publication Data

US 2002/0104387 A1 Aug. 8, 2002

(51) Int. Cl.⁷ .................................................. G01F 1/40
(52) U.S. Cl. .................................. 73/861.53; 73/861.58
(58) Field of Search ......................... 73/861.52, 861.53, 73/861.58

(56) References Cited

U.S. PATENT DOCUMENTS

| 3,766,779 | A | | 10/1973 | Hoffman | 73/228 |
|---|---|---|---|---|---|
| 4,041,758 | A | | 8/1977 | Stenberg | 73/207 |
| 4,297,899 | A | * | 11/1981 | Blaney et al. | 73/861.58 |
| 5,458,007 | A | | 10/1995 | Lake | 73/861.58 |
| 6,216,727 | B1 | * | 4/2001 | Genova et al. | 137/460 |

OTHER PUBLICATIONS

Official Search Report of EPO/ISA from PCT/US02/22081.
"Industrial Flowmeter" *Measurement Technologies*, Jun. 2000.

* cited by examiner

*Primary Examiner*—Edward Lefkowitz
*Assistant Examiner*—Corey D. Mack
(74) *Attorney, Agent, or Firm*—Marshall, Gerstein & Borun LLP

(57) ABSTRACT

An in-line gas flow rate sensor includes a movable flow orifice and a fixed flow restrictor adjacent the flow orifice for changing the gas flow through the flow orifice. The flow orifice and the flow restrictor are formed so that each uniform increment of flow orifice movement provides a constant percent of flow change through the flow orifice. A magnet fixed to the movable flow orifice provides changing magnetic flux corresponding to each uniform increment of flow restrictor movement. A magnetic flux sensor responds to the changing magnetic flux and provides an output corresponding to a constant percent of flow rate changes.

6 Claims, 2 Drawing Sheets

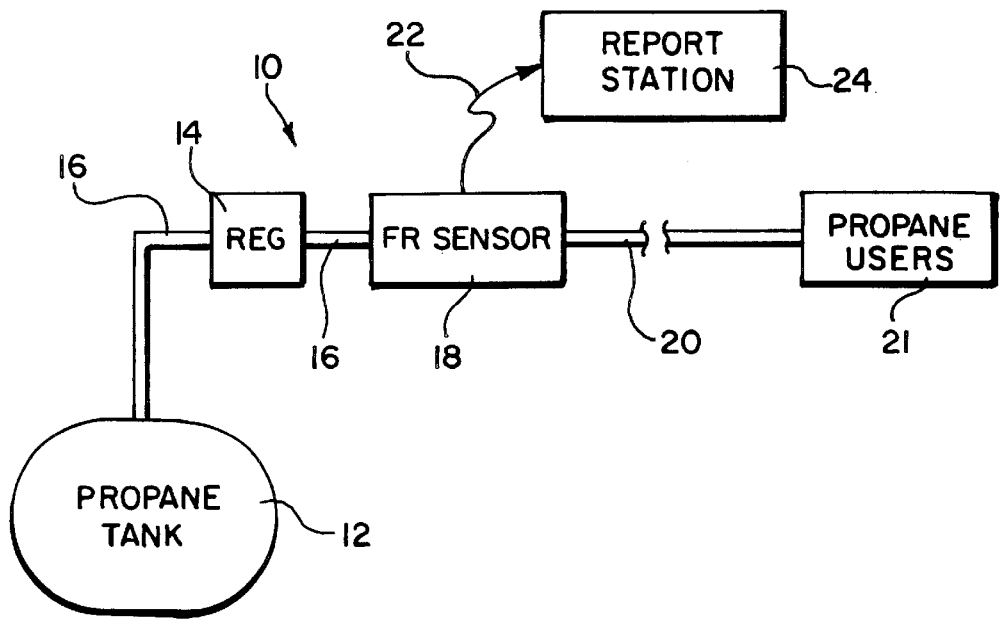
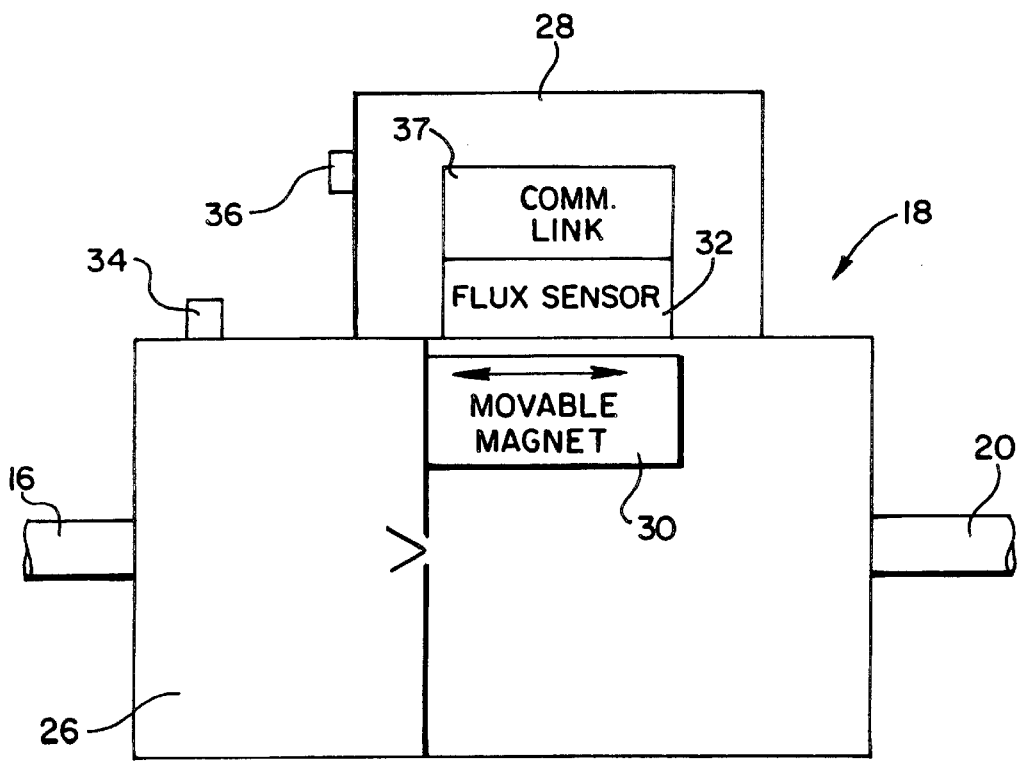

GAS LEVEL MONITORING SYSTEM AND GAS FLOW RATE SENSOR USED THEREIN

This invention relates to devices for measuring gas flow rates and in particular to in-line gas flow rate sensors and to systems utilizing such sensors.

BACKGROUND OF THE INVENTION

In a propane gas system where the gas consumers are supplied propane gas from a propane tank supply, a float level sensor is used in the propane tank to monitor the propane gas level. In such systems, the user periodically views the tank level sensor and then requests delivery of replacement propane gas as required. While such fuel level sensors which are mounted in the tank can provide a reliable indication of the gas level remaining in the tank, they are difficult to maintain and time-consuming to repair when needed in view of their placement within the tank itself.

It is therefore desired to provide a propane tank level monitoring system which can not only sense and display the level of gas in the propane tank, but which can also provide a signal to a central location to use the information to track gas usage rate and to schedule delivery of replacement fuel as needed. In particular, it is desired to provide an in-line gas flow rate sensor for sensing the gas flow rate from which the level of the propane gas remaining in the tank can be derived.

SUMMARY OF THE INVENTION

In accordance with the principles of the present invention, there is provided an in-line gas flow rate sensor using a Hall effect sensor responding to changing magnetic flux corresponding to changing gas flow rates to produce an output signal representing changes in the gas flow rate.

In particular, there is provided a gas flow rate sensor which includes a flow tube, a diaphragm member movably mounted in the flow tube and which has a central aperture for receiving the gas flow. A tapered plug is mounted in the flow tube with a free plug end projecting within the central aperture of the diaphragm member. A spring has one end fixed in the flow tube and a movable end in contact with the diaphragm member to resiliently urge the diaphragm member into contact with one end of the tapered plug corresponding to a central aperture closed position. In response to increasing gas rates, the diaphragm member is moved along the tapered plug away from the central aperture closed position and towards the free plug end.

A magnet is fixed to the movable diaphragm member for slidable movement within the flow tube to respond to increasing gas flow rates and thereby provide a changing magnetic flux, and a magnetic flux sensor is mounted adjacent the magnet for responding to the changing magnetic flux and thereby producing an output signal for presenting changes in the gas flow rate.

The tapered plug includes a plug outer surface shaped to provide a linear relationship between the magnetic flux density and the output of the magnetic sensor. Thus, as the diaphragm member containing the magnet is moved for instance from an initial flow tube orifice closed position on the tapered plug to an orifice opened position with respect to the tapered plug in response to an increased gas flow rate, the output of the magnetic sensor follows in a linear relationship from the orifice closed to the orifice opened position. The output of the magnetic sensor thereby provides a signal indication which can be utilized in a known manner to provide the gas flow rate.

The flow rate sensor includes a pressure sensor for sensing the gas pressure at the inlet of the flow tube and a temperature sensor for indicating the temperature of the gas. Using a well known algorithm, such as the Universal Gas Sizing Equation, with the values of the gas pressure, temperature, output signal from the magnetic sensor, and known physical parameters of the flow rate sensor, the gas flow rate can be obtained. Accordingly, starting with a known full gas tank level and having determined the gas flow rate exiting the tank, the actual level of gas remaining in the tank can readily be determined. This information can conveniently be utilized for scheduling delivery of replacement fuel to the tank.

BRIEF DESCRIPTION OF THE DRAWINGS

The features of this invention which are believed to be novel are set forth with particularity in the appended claims. The invention may be best understood be reference to the following description taken in conjunction with the accompanying drawings, in which like reference numerals identify like elements in the several figures and in which:

FIG. 1 is a schematic diagram of a propane gas tank distribution system incorporating an in-line flow rate sensor according to the present invention;

FIG. 2 is a schematic diagram illustrating an in-line flow rate sensor according to the present invention including an in-line flow tube.

DETAILED DESCRIPTION

Figure 3:
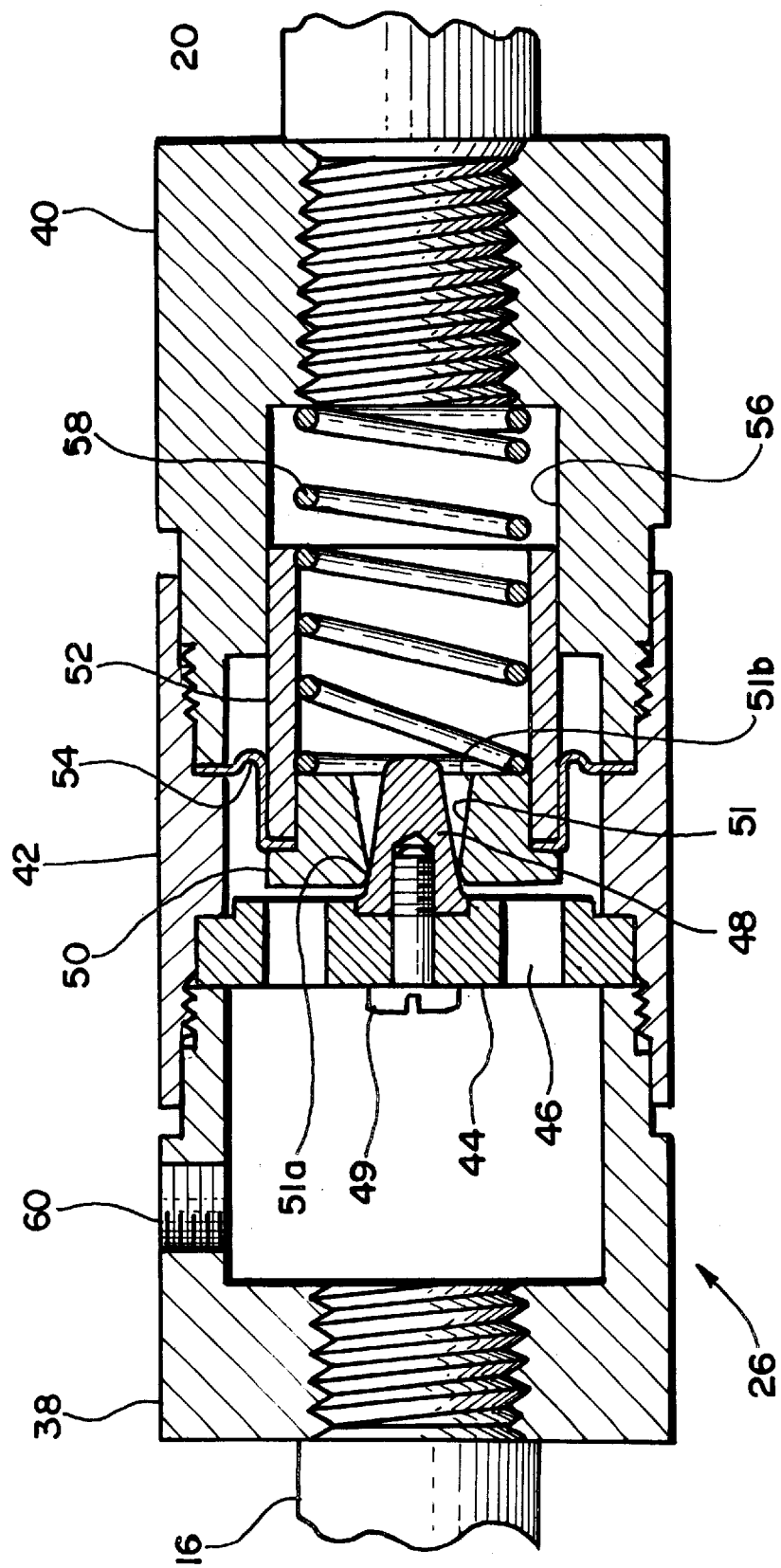
FIG. 3 is a cross sectional view illustrating a gas flow rate sensor in accordance with the present invention.

FIG. 1 illustrates a propane gas distribution system 10 which includes a tank 12 containing a supply of propane gas. A pressure regulator 14 regulates the gas pressure in a supply conduit 16 which is coupled to an in-line flow rate sensor 18. The gas flow output of the flow rate sensor 18 is coupled on an outlet conduit 20 to users 21 of the propane gas. The gas flow rate sensor 18 includes a communication link to provide a signal on output line 22 representing the gas flow rate which signal is coupled to a report station 24. The report station 24 uses the gas flow rate information to determine the level of propane remaining within the propane tank 12 and can then schedule delivery of replacement gas to the tank 12 as needed.

FIG. 2 schematically illustrates the in-line gas flow rate sensor 18 in accordance with the present invention which includes a flow tube 26 and an auxiliary housing 28 mounted on the flow tube 26. A movable magnet 30 is mounted within the flow tube 26 and acted upon by the gas flow from conduit 16 to provide a changing flux density in response to the changing gas flow rate. A magnetic sensor 32, such as a Hall effect sensor, is mounted in the auxiliary housing 28 and closely adjacent the magnet 30 so as to detect the changing flux density corresponding to the changing gas flow rate. A pressure sensor 34 is mounted in the flow tube to detect the pressure of the gas inlet from inlet conduit 16. A temperature sensor 36 is mounted in the auxiliary housing 28 to detect the gas temperature. The respective outputs of the magnetic sensor 32, pressure sensor 34 and temperature sensor 36 are coupled to a communications link 37 for supplying the corresponding information on output line 22 to the report station 24. With this information the gas flow rate can be obtained using a well known algorithm, such as the Universal Gas Sizing Equation, and the level of gas remaining in the tank 12 also can be readily obtained.

The details of the schematic view FIG. 2 of the flow rate sensor 18 are shown in the cross sectional view of FIG. 3.

As shown in the cross-sectional view of FIG. 3, the flow tube 26 includes an inlet tube 38 and an outlet tube 40 which are threadably joined together by an orifice guide 42. The inlet tube 38, the outlet tube 40, and the orifice guide 42 are all formed of a non-magnetic metal such as brass or aluminum. A flow plate 44 is formed of a plastic material and includes a series of flow holes 46 to evenly distribute the inlet gas flow from inlet conduit 16. A tapered plug 48 is mounted to the flow plate 44 by a threaded screw 49.

A movable orifice member 50 includes a central opening 51 surrounding the tapered plug 48 with an upstream opening 51a being smaller than a downstream opening 51b so that the central opening 51 is outwardly diverging. As shown in FIG. 3 there is an increasing space between the tapered plug 48 and the central opening 51 in the downstream flow direction.

A magnet member 52 is mounted to the orifice member 50 with a flexible diaphragm 54 having its inner perimeter inserted therebetween, and with the outer perimeter of the diaphragm mounted between the outlet tube 40 and the orifice guide 42. The magnet member 52 is slidably mounted within a cavity 56 provided in the outlet tube 40, so that with changing gas flow rates, the plug holder 50 and attached magnet member 52 slidably move within the cavity 56. A spring 58 is captured between the outlet tube 40 and the orifice member 50 and has sufficient resiliency to move the upstream opening 51a of the orifice member 50 to one end of the plug 48 as shown in FIG. 3 when there is no gas flow. As the gas flow rate is increased, the orifice member 50 and associated magnet member 52 is moved away from the closed position and eventually to a position with respect to the plug 48 representing a maximum gas flow rate position.

The tapered plug 48 and the outwardly diverging central aperture are shaped so that there is a direct linear relationship provided between the change in the flow orifice (i.e., the space between the tapered plug 48 and the central opening 51) and the flow rate change. In other words, with the flow orifice closed as shown in FIG. 3, and going to a fully opened flow orifice position which represents the maximum gas flow rate position, the shape of plug 48 and the shape of the central opening 51 provides a linear relationship between the change in the magnetic flux density created by the movement of magnet 52 and the output from the magnetic sensor 32. Thus, plug 48 and central opening 51 may be termed an "equal percent plug" which provides an equal percent flow orifice, i.e., with each uniform increment of orifice member 50 there is provided a constant percent of flow change through the flow orifice. Thus, a linear relationship exists between the magnetic flux density and the output of the magnetic sensor 32 in response to a changing flow rate through the flow orifice.

In a constructed prototype embodiment of the invention the central aperture was formed outwardly diverging at an angle of about 10 degrees, and the tapered plug was formed inwardly converging at an angle of about 6 degrees.

A mounting port 60 in the inlet tube 38 enables mounting of the pressure sensor 34. Utilizing the output of the magnetic sensor 32, as well as the information from the pressure sensor 34 and the temperature sensor 36 enables the gas flow rate to be determined using an algorithm well known in the industry. Once the gas flow rate has been determined, the amount of gas remaining within propane tank 12 can readily be determined, and delivery of any replacement fuel can be scheduled as required.

The foregoing detailed description has been given for clearness of understanding only, and no unnecessary limitations should be understood therefrom, as modifications will be obvious to those skilled in the art.

What is claimed is:

1. A gas level monitoring system for a tank, comprising:
    a gas flow rate sensor having:
        a flow tube with a flow inlet in fluid communication with the tank and a flow outlet;
        a diaphragm member movably mounted in the flow tube between the flow inlet and the flow outlet and having a central aperture for receiving the gas flow;
        a tapered plug fixedly mounted in the flow tube and having a free plug end projecting within the central aperture of the diaphragm member;
        a spring having a fixed end mounted in the flow tube and a movable end in contact with the diaphragm member for resiliently urging the diaphragm member into contact with one end of the tapered plug corresponding to a central aperture closed position, with the diaphragm member moved (1) away from the central aperture closed position and towards the free plug end in response to increasing gas flow rates, and (2) away from the free plug end and towards the central aperture closed position in response to decreasing gas flow rates;
        a magnet fixed to the movable diaphragm member for slidable movement within the flow tube and thereby responding to changing gas flow rates to provide changing magnetic flux;
        a magnetic flux sensor fixedly mounted adjacent the magnet for responding to the changing magnetic flux provided by the magnet and producing an output signal representing changes in a gas flow rate;
        a temperature sensor positioned to detect a temperature of the gas and generate a temperature signal;
        a pressure sensor in fluid communication with an interior of the flow tube for detecting a pressure of the gas and generating a pressure signal; and
        a communications link coupled to the temperature sensor, pressure sensor, and magnetic flux sensor for communicating the temperature signal, pressure signal, and output signal; and
    a report station communicatively coupled to the communications link for receiving the temperature signal, pressure signal, and output signal, calculating a gas flow rate based on the temperature signal, pressure signal, and output signal, determining a remaining gas level in the tank based on the calculated gas flow rate, and scheduling delivery of replacement gas to the tank.

2. A gas flow rate sensor according to claim 1, wherein said central aperture is outwardly diverging and said plug is inwardly convergingly tapered in the downstream flow direction.

3. A gas flow rate sensor according to claim 2, wherein a linear relationship is provided between the change in gas flow rates and the corresponding changes in the magnetic flux.

4. A gas flow rate sensor according to claim 1, wherein said diaphragm member includes a diaphragm base with said central aperture, and a flexible diaphragm having an inner perimeter mounted to the diaphragm base and an outer perimeter mounted to the flow tube.

5. A gas flow rate sensor according to claim 4, wherein said central aperture is outwardly diverging and said plug is inwardly convergingly tapered in the downstream flow direction.

6. A gas flow rate sensor comprising:

a flow tube having a flow inlet and a flow outlet;

a movable flow orifice member movably mounted within the flow tube including a flow orifice enabling the gas flow therethrough;

a fixed flow restrictor mounted adjacent the flow orifice member for changing the gas flow through the flow orifice member, the flow orifice member and the flow restrictor formed so that each uniform increment of flow orifice member movement with respect to the fixed flow restrictor provides a constant percent of flow change through the flow orifice;

a magnet fixed to the movable flow orifice member providing changing magnetic flux corresponding to each uniform increment of flow orifice member movement; and a magnetic flux sensor responding to the changing magnetic flux and providing an output corresponding to a constant percent of flow rate changes.

* * * * *